United States Patent
Taylor

[11] Patent Number: 5,818,495
[45] Date of Patent: Oct. 6, 1998

[54] CRT PRINTER FOR LENTICULAR PHOTOGRAPHS

[75] Inventor: Roy Y. Taylor, Scottsville, N.Y.

[73] Assignee: Eastman Kodak Company, Rochester, N.Y.

[21] Appl. No.: 974,441

[22] Filed: Nov. 12, 1992

[51] Int. Cl.⁶ .................................................. G01D 9/42
[52] U.S. Cl. .................................................. 347/226
[58] Field of Search ................... 346/110 R; 355/20, 355/22; 347/226, 229, 230

[56] References Cited

U.S. PATENT DOCUMENTS

| | | | |
|---|---|---|---|
| 4,240,729 | 12/1980 | Barney | 346/110 R X |
| 4,468,115 | 8/1984 | Lao | 355/22 |
| 4,724,449 | 2/1988 | Wright | 354/112 |
| 4,956,705 | 9/1990 | Wright | 358/88 |
| 5,019,855 | 5/1991 | Lam | 355/22 |
| 5,041,914 | 8/1991 | Ban | 346/110 R X |
| 5,049,902 | 9/1991 | Duke | 346/110 R |
| 5,111,236 | 5/1992 | Lo | 355/22 |
| 5,337,102 | 8/1994 | Winnek | 355/22 X |

Primary Examiner—Michael L. Gellner
Assistant Examiner—Rudy W. Gibson
Attorney, Agent, or Firm—Edward Dugas

[57] ABSTRACT

A printer device for lenticular photographic images easily transforms electronic image files into photographic hard copy. The printer device includes a cathode ray tube screen and a projection lens. A filter wheel may be used for inserting optical filters into the optical path of the projection lens. A lenticular photographic print assemblage is aligned and affixed at the focal plane of the projection lens. The lens and the image on the cathode ray tube screen are then moved in differential amounts in the direction parallel to the plane of the aligning and affixing process, and normal to the axis of the lenticules on the lenticular photographic print assemblage. Finally, an electronic video display driver and computer coordinate the motions with changes of the images displayed on the cathode ray tube to allow the correct exposures of color and angular perspective views inherent in the image files onto the photographic emulsion coating of the lenticular photographic print assemblage, for the subsequent developing and autostereoscopic viewing.

17 Claims, 4 Drawing Sheets

CRT PRINTER FOR LENTICULAR PHOTOGRAPHS

TECHNICAL FIELD

The present invention is directed to the field of lenticular photography photofinishing and, more particularly, to an apparatus which allows the printing of electronic representations of alternate perspective images on lenticular reflection print materials.

BACKGROUND ART

Three-dimensional photography, including autostereoscopic imaging and stereoscopic imaging on the basis of the amount of information involved, is well known in the art. The quantity of information for a stereoscopic (or binocular) image is only twice that of a planar (two-dimensional) image, while much greater information is present for a truly three-dimensional image (also termed parallax panoragrams). Images of the latter type are truly spatial images that gradually show more of the right side of the object when the observer moves rightward, and more of the left side of the object when the observer moves leftward.

Lenticular material are known in the art for use as a method of creating an autostereoscopic image. Early lenticular photography procedures utilized the optical imaging of the lens elements in the faceplate to record a subject directly, as if each tiny lens element was a separate camera. A printing operation was subsequently performed by contacting the print and its faceplate to a second lenticular faceplate and emulsion layer. This provided both a positive density reversion and an optical reversion to a right-reading image, as opposed to a mirror image.

Imaging processes then began to generate lenticular prints from a series of photographs taken from differing horizontal perspectives. This printing method, with an optic enlarger, requires much care on the part of the photographic technician to correctly orient the negatives, maintain their sequence, and readjust the lateral setbacks, all in a darkroom to avoid fogging the emulsion. An additional printing operation, however, was not necessary to produce the final lenticular print, since density and optical inversion was achieved by using negative density images and inverting their orientation in the enlarger.

Materials and manufacturing methods eventually progressed to a point where configuring rolls of plastic sheet with accurate lenticular features became feasible. U.S. Pat. No. 3,751,258 described an autostereographic print element which included a water-permeable reflecting layer at the back surface, allowing access of the developer to the emulsion layer. Later, three-dimensional camera photofinishing printer systems used photographic print emulsion coated directly onto the backside of the lenticular faceplate.

CRT printers have been utilized since the early 1970's in the photofinishing industry to generate planar prints on photographic papers and films. A desired image is presented on a CRT screen which is subsequently projected on the photographic emulsion for exposure. The optical system is securely aligned and focused and image content and special effects can be introduced by processing the video signal into the CRT screen. It was a natural consequence, then, to combine this process with the CRT printer concept, wherein the CRT screen is projected onto a film surface to produce a print. The CRT printer concept incorporated automatic mechanical motions of the enlarger components to achieve the required lateral motions with accurate image selection and registration to the viewing window.

In the existing art, U.S. Pat. Nos. 4,724,449 and 4,956,705 relate to a method and apparatus for taking multiple lateral photographs for use in three-dimensional photography, in which the object is photographed from a number of positions which are spaced apart. Unfortunately, these patents do not offer any teaching related to a printing process which transforms the multiple photographs to a lenticular photograph.

It is seen then that it would be desirable to have a technique which allows the printing of electronic representations of alternate perspective images on lenticular materials.

SUMMARY OF THE INVENTION

The present invention allows the printing of electronic representations of alternate perspective images on emulsion coated lenticular materials, using a Cathode Ray Tube (CRT) printer. The present invention is applicable to any suitable emulsion coated lenticular materials, including reflection print materials, and transparency materials. CRT photographic printers allow the printing of images from electronic files at moderately fast print rates, and are relatively simple in construction.

The principal value of CRT photographic printer technology is to easily transform electronic image files into photographic hard copy. The electronic image files can be derived from a variety of original sources, including conventional photographic negatives which have been scanned, readouts from electronic still cameras, television pictures, and computer-generated pictures. Since light can be considered as reversible along the same ray paths for recording and projecting light, the present invention uses the same optical ray paths for recording images in a similar fashion for projecting images in a converse projector system for optical design.

In accordance with one aspect of the present invention, a CRT printer is utilized to reproduce multiple alternative perspective images directly onto an emulsion coated on the second side of a lenticular faceplate. The mechanical and/or electronic design of the equipment would automate the exposure process by properly shifting the relative location of the print material and the CRT image position in relation to the lens optical axis for successive exposures of the print, until all perspectives are recorded. Alternatively, the images may be reproduced using a lenticular material and a separate emulsion-coated film, wherein the film is held in contact with the rear surface of the lenticular faceplate.

Accordingly, it is an object of the present invention to provide a printing apparatus for printing electronic representation of alternate prospective images on emulsions viewed through lenticular materials. It is a further object of the present invention to provide such a printer to reproduce multiple alternative perspective images directly onto print or transparency emulsion coated on or otherwise placed in contact with the second side of a lenticular faceplate. It is an advantage of the present invention that electronic image files can be easily transformed into photographic hard copy.

Other objects and advantages of the invention will be apparent from the following description, the accompanying drawings and the appended claims.

DETAILED DESCRIPTION OF THE PREFERRED EMBODIMENTS

Conventional techniques for taking multiple electronic photographs of a three-dimensional image are described in U.S. Pat. Nos. 4,724,449 and 4,956,705, the disclosures of which are incorporated herein by reference in their entireties.

Figure 1:
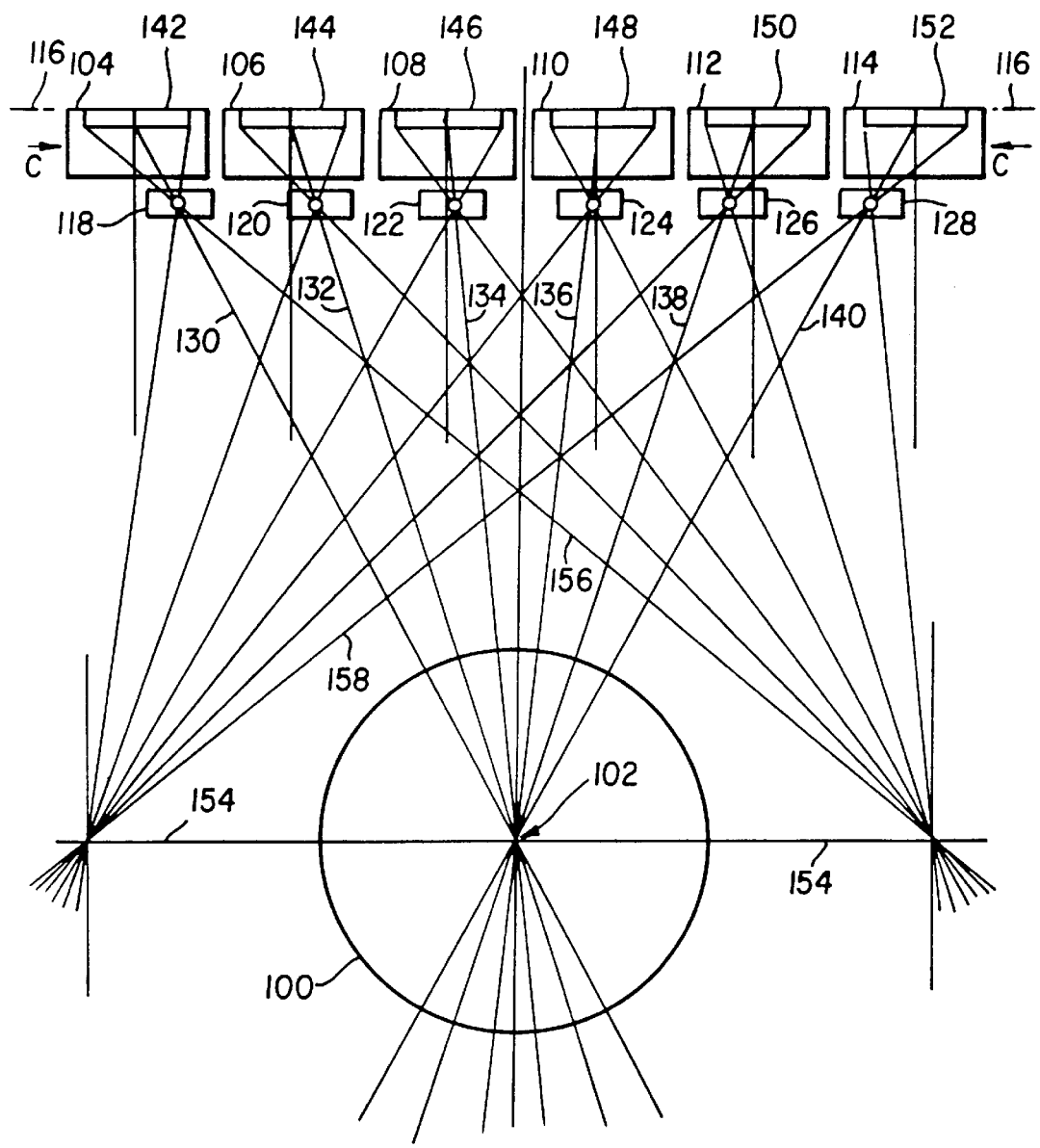
FIG. 1 is an overall plan view of a prior art system showing the configuration of cameras relative to the object whose picture is being taken.

Referring to the drawings, FIG. 1 illustrates a prior art technique of U.S. Pat. Nos. 4,724,449 and 4,956,705 for taking a plurality of either photographic or electronic photographs of a three-dimensional object 100. The three-dimensional object 100 has a focus point 102 at its center. Reference numerals 104–114 show a plurality of different positions of a camera body C, which is progressively shifted to different positions, or a plurality of camera bodies which are located in the different positions, from which the different pictures of object 100 are to be taken.

Since light can be considered as reversible along the same paths for recording and projecting light, a converse projector system to the camera system described in the prior art can be similarly illustrated. In FIG. 1, boxes 104–114 illustrate depictions of a single projector body shifting laterally from a leftmost position to a rightmost position along a line 116. Similarly, boxes 118–128 are depictions of a projector lens shifting laterally from its leftmost position to its rightmost position. The location of lens 118–128 relative to the projector body 104–114 can be determined by drawing lines 130–140 through the lens centers and the center of negatives of an electronic imaging device array of each camera position in imaging planes 142–152. All of the lines 130–140 meet at a common point, which is the focus point 102. Consequently, since lens shifts 118–128 are displaced laterally along a line 154 parallel to line 116, which line 154 is closer to point 102 than the line 116 is to point 102, the shifts of the lens will be proportional to, but less than, the shifts of the projector body 104–114. That is, the shifts of the lens would be equal to the shifts of the projector multiplied by the ratio of the distance from the line along which the lens shifts to point 102, to the distance between line 116 and point 102.

Continuing with FIG. 1, line 154 is parallel to line 116, as shown, and includes point 102. In the apparatus, a flat table could be constructed to carry lenticular print assemblage in such a manner that a plane tangent to the outer reaches of the lenticules would be perpendicular to the plane of the illustration and would include line 154. This plane could be termed an image window plane. The assemblage may be a lenticular material with an emulsion coating on its rear surface, or may be a lenticular material and an emulsion coated film held in contact with the rear surface of the uncoated lenticular material.

In three-dimensional lenticular prints, image elements lying in the image window plane do not appear to change location as the print is viewed from different angles. This may not seem obvious unless one considered printing a border which was expected to remain stationary with respect to the picture edges. Under these conditions, the border would be printed at the same location for each perspective and, consequently, would remain stationary in location as the print is viewed from different angles. Conversely, image elements not lying in the image window plan do appear to change location as the print is viewed from different angles.

Figure 2:
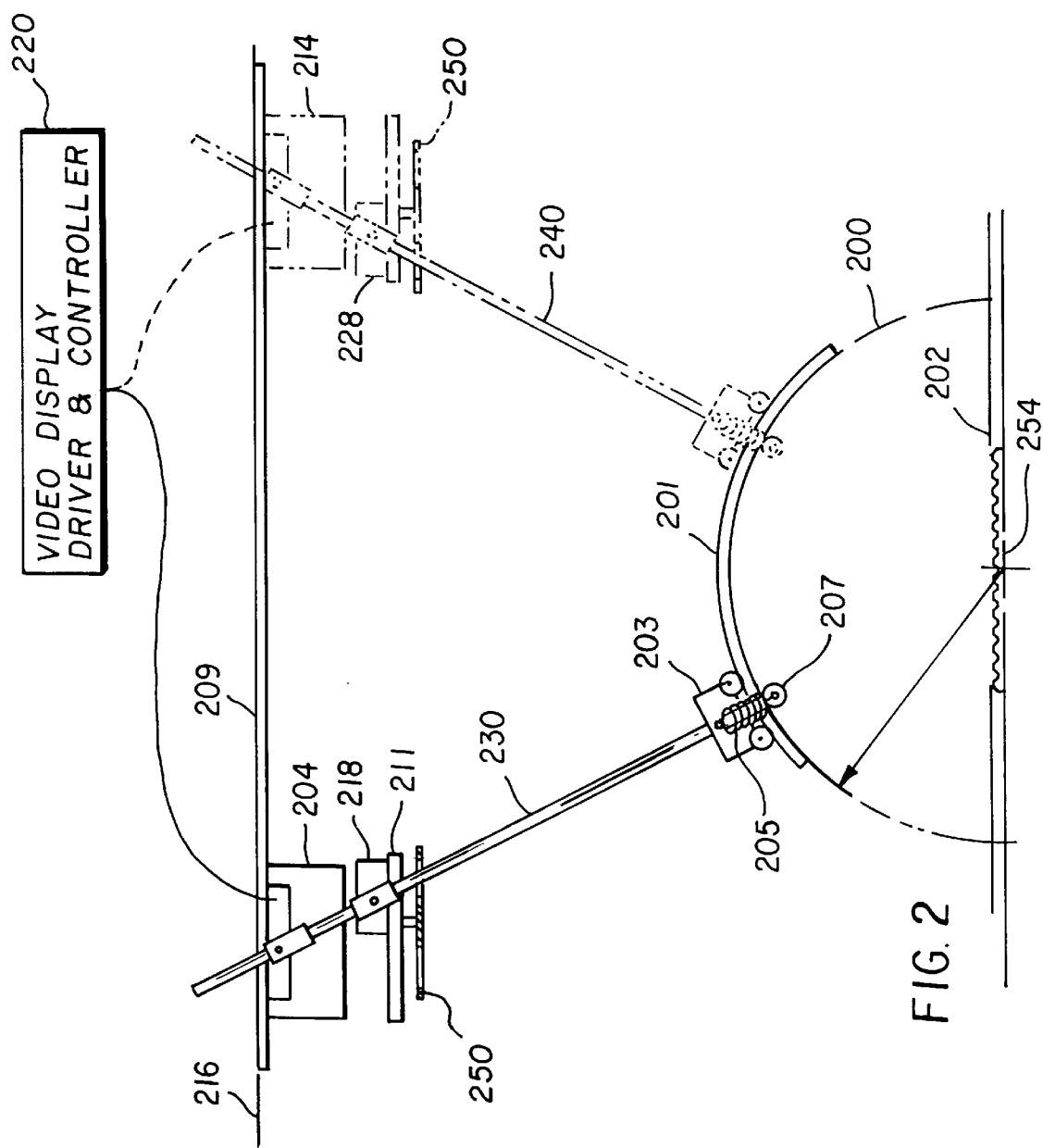
FIG. 2 is a mechanical means of providing lens and CRT shifts.

Referring now to FIG. 2, a mechanical means of providing these lens shifts is shown, in accordance with the present invention. It should be noted that it will be obvious to persons skilled in the art that lens shifts and motion can be accomplished in a variety of suitable ways, and still be within the scope of the invention. For example, the necessary motion may be accomplished by mechanical means, as illustrated in FIGS. 2; electronic means, as illustrated in FIG. 3, or a combination of mechanical and electronic means, such as is illustrated in FIG. 4.

In FIG. 2, arc 200 is a radial curve, the center of which is located at the print window plane 202. Therefore, as long as contact is maintained with the track, a bar 230 will be coincident with radii drawn from that center. The center of the arc 200 is nominally located at the image window which usually coincides with the plane of the lenticular side of the faceplate 254. A track 201 is made to conform to the curvature of 200 and carries a truck 203 to which is affixed the rod 230 nominally normal to the track tangent, being held in contact with the track 201 by a means such as tension spring 205 and wheel 207. Lens frame guide 218 and CRT screen guide 204 slide freely on rod 230 and are affixed to pivot on the lens frame and CRT screen, respectively, locating the lens rear principal plane center and CRT screen center on the centerline of the rod 230, while a second track 209 constrains the motion of the projector body to a direction parallel to line 216. A third track 211, affixed to the projector housing, constrains the motion of the lens to a direction parallel to track 209. Since the front and rear principal planes of a lens often do not coincide, a combination of displacing the center of the track relative to the image window and reconfiguring the track 201 contour could be made to compensate for this difference.

Continuing with FIG. 2, the CRT screen guide 204 traverses from the leftmost position associated with rod 230 to the rightmost position shown in the cross-hatched area and associated with rod 240, and is referred to as CRT screen guide 214 at the leftmost position. As the CRT screen guide travels from left to right, the lens guide 218 automatically shifts to remain in line with the center of the print window 202, by virtue of the mechanical linkage previously described, to become lens guide 228 in the rightmost position. Video display driver and controller 220 controls the presentation of images on the CRT.

Figure 3:
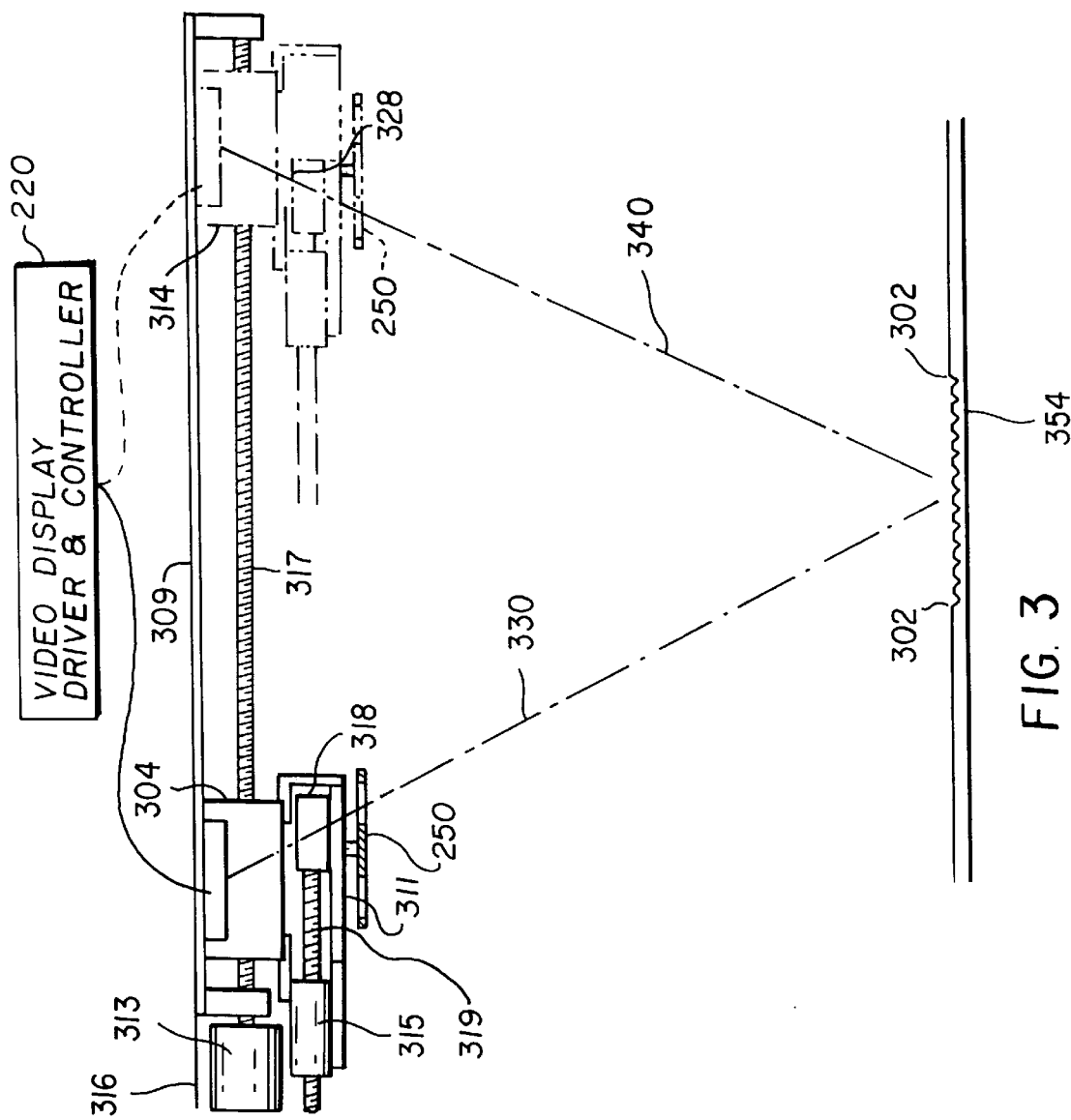
FIG. 3 is an electro-mechanical means of providing lens and CRT shifts.
Figure 4:
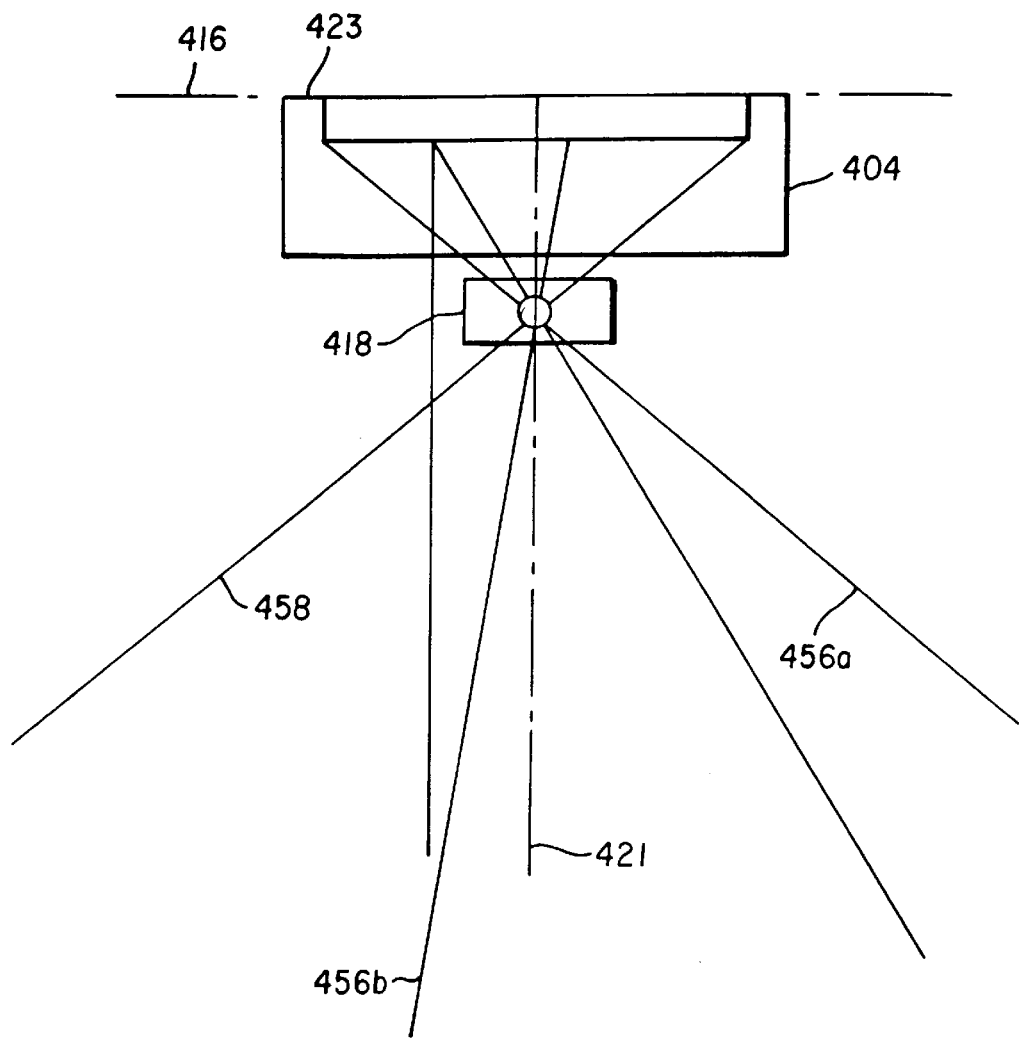
FIG. 4 is an alternative mechanical approach to providing lens shifts relative to the CRT screen.

Alternatively, referring now to FIG. 3, electronic control may be used to move the components along an imaginary track line 309 from a leftmost imaginary track line 330 to a right radial alignment line 340. The CRT screen guide 304 and lens guide 318 may be moved with programmed stepper motors 313 and 315 and driving lead screws 317 and 319 for lateral displacement. Additionally, a combination of electrical and mechanical means may be used to achieve motion, or special effects. A similarity can be seen in the relative positions of the CRT screens 204 with 304 and 214 with 314; lens 218 with 318 and 228 with 328; print windows 202 with 302; and radial alignment lines as rods 230 and 240 with imaginary rods 330 and 340; as depicted in FIGS. 2 and 3, respectively.

In FIG. 3, a similar geometry of the CRT screen guide 304 and lens guide 318 is maintained in FIG. 3, by control of the stepper motors 313 and 315, which in turn rotate leadscrews 317 and 319 to create linear motions of the aforementioned components. The lens guide, track, and stepper motor 315 assemblage is attached to the CRT screen guide 304 so that leadscrew 319 only compensates for the relative position of the lens guide 318. Optical filters in the form of a filter wheel 250 are inserted into the optical path of the projection lens.

Continuing with FIG. 3, the CRT screen guide 304 traverses from the leftmost position associated with radial alignment line 330 to the rightmost position shown in the cross-hatched area and associated with radial alignment line 340, and is referred to as CRT screen guide 314 at the rightmost position. As the CRT screen guide travels from left to right, the lens guide 318 automatically shifts to remain in line with the center of the print window 302, by virtue of the electronic control previously described, to become lens guide 328 in the rightmost position.

Obviously, hybrid combinations of design concepts shown in FIGS. 2 and 3 could be constructed, such as where the CRT screen guide is positioned by a stepper motor and leadscrew device and the lens by mechanical linkage or vice versa. Another concept category could utilize the mechanical linkage to provide the basic motions required, but with stepper motor and leadscrew mechanisms added to trim the exact locations to compensate for lens distortions or mechanical parts variances.

An alternative embodiment of the present invention is also illustrated in FIG. 4. FIG. 4 is a simpler mechanical design approach, which includes electronic control, wherein the CRT screen 404 is intentionally larger in area than a single perspective image requires, and the location of the image on the screen face is changed as well as the image content to expose the print from any particular perspective. In this way, the projector housing and lens housing can be affixed to each other permanently and moved as a unit by the amounts equivalent to the lens shifts, with the image shifts being differentially greater and with the image shifts being accomplished by electronic relocation of the image on the CRT screen.

The CRT screen 404 in FIG. 4 is larger than the CRT screen 204 and 304 of FIGS. 2 and 3, but with a fixed lens-projector housing design. The lens of the large CRT projector is shown as 418 and its optical centerline as line 421. To show a continuity between FIGS. 1 and 4, camera lens 418 shown in FIG. 4 is at the same position as the camera lens 118 shown in FIG. 1. Other positions of the camera lens analogous to those in FIG. 1 are reached by physically transporting the camera along line 416. Lines 456*a*, 456*b*, and 458*a* are transposed to FIG. 4 from line pair 156 and 158 of FIG. 1. The CRT screen in the shift direction must be at least as large as the distance between the intercepts of lines 456*a* and 458 with line 416, and these must be equidistant from the intercept of line 421 with line 416. In this position, the image occupies the portion of the CRT screen 423 contained between the intercepts of lines 456*b* with the screen surface 423. As the projector is transported along line 416, the image occupies other portions of the CRT screen analogous to that as shown in FIG. 1.

Printing images with shifted image window planes in this manner could also easily be accomplished by a different set of electronic image location values. The electronic image location values for a wide range of image window plane locations would then be stored in lookup tables in a system computer. As will be obvious to persons skilled in the art, combinations of motions and electronic image locators are also possible.

The present invention provides for a CRT printer, utilized to reproduce multiple alternative perspective images directly onto a photographic emulsion contacting the second side of a lenticular faceplate. The mechanical and electronic design of the equipment automates the exposure process by properly shifting the print material and the image location relative to the lens optical axis for successive exposures of the print, until all perspectives are recorded.

INDUSTRIAL APPLICABILITY AND ADVANTAGES

The present invention is useful in the field of lenticular integral photography, and has the advantage of providing a printer for reproducing multiple alternative perspective images directly into light sensitive print emulsion contacting the second side of a lenticular faceplate. The mechanical and electronic design automates the exposure process by properly shifting the print material and the image location relative to the lens optical axis for successive exposures of the print until all perspectives are recorded. The ease of electronic image alteration offers advantages to the CRT printer application, in that images and shapes can be electronically compensated for distortion in the lens for off axis positions. It is a further advantage of the present invention that the lenticular photographic system presents a superior presentation of depth in a hand-held print size image, while keeping printing costs low, but the advantage can be applied to larger print sizes as well. Finally, the present invention provides the advantage of being adaptable for use in the commercial service market, producing high-image quality prints at rates on the order of six to twenty prints per minute.

Having described the invention in detail and by reference to the preferred embodiment thereof, it will be apparent that other modifications and variations are possible without departing from the scope of the invention defined in the appended claims.

What is claimed is:

1. A printer device for lenticular photographic images comprising:

a cathode ray tube screen for displaying images;

a projection lens having an optical path;

a means for inserting optical filters into the optical path of the projection lens;

an aligning means for aligning the cathode ray tube screen at an object conjugate focal plane of the projection lens while a piece of lenticular photographic print assemblage is aligned at an image conjugate focal plane of the projection lens;

a lens moving means for moving the lens a first differential amount in a direction parallel to a plane of the lenticular photographic print assemblage and normal to an axis of the lenticules on the lenticular photographic print assemblage;

an image moving means for moving the image on the cathode ray tube screen a second differential amount in the direction parallel to the plane of the lenticular photographic print assemblage and normal to the axis of the lenticules on the lenticular photographic print assemblage; and an electronic video display driver and computer coordinating motions with changes of the images displayed on the cathode ray tube screen to allow correct exposures of color and angular perspective views inherent in image files onto photographic emulsion coating of the lenticular photographic print assemblage, for subsequent developing and autostereoscopic viewing.

2. A printer device as claimed in claim 1 wherein the lenticular photographic print assemblage comprises a lenticular material coated with an emulsion on a rear surface of the lenticular material.

3. A printer device as claimed in claim 1 wherein the lenticular photographic print assemblage comprises a lenticular material and a film coated with an emulsion and held in contact with a rear surface of the lenticular material.

4. A printer device as claimed in claim 1 wherein the means for inserting optical filters into the optical path of the projection lens comprises a filter wheel.

5. A printer device as claimed in claim 1 wherein the motions are achieved using mechanical means.

6. A printer device as claimed in claim 1 wherein the motions are achieved using electrical means.

7. A printer device as claimed in claim 1 wherein the motions are achieved using a combination of mechanical and electrical means.

8. A system for printing electronic representations of alternate perspective images on lenticular materials comprising:

a lenticular faceplate having a front surface and a rear surface;

means for contacting a photographic emulsion on the rear surface of the lenticular faceplate;

a CRT printer, including a CRT screen, for reproducing multiple alternative perspective images through the lenticular faceplate onto the photographic emulsion;

optical filters between the CRT and the lenticular faceplate; and means for automating an exposure process of the CRT printer so successive exposures of a desired image on the CRT screen are recorded on the photographic emulsion through the optical filters.

9. A system for printing electronic representations as claimed in claim 8 wherein the means for contacting a photographic emulsion on the second side of the lenticular faceplate comprises means for coating the second side of the lenticular faceplate with a photographic emulsion.

10. A system for printing electronic representations as claimed in claim 8 wherein the means for contacting a photographic emulsion on the second side of the lenticular faceplate comprises means for holding an emulsion coated film in contact with the second side of the lenticular faceplate.

11. A system for printing electronic representations as claimed in claim 8 wherein the means for automating an exposure process comprises a combination of motions and electronic image locations on the CRT screen.

12. A system for printing electronic representations as claimed in claim 8 wherein the photographic emulsion is a reflection print.

13. A system for printing electronic representations as claimed in claim 8 wherein the photographic emulsion is a positive transparency print.

14. A system for printing electronic representations as claimed in claim 8 wherein the photographic emulsion is a negative transparency print.

15. A system for printing electronic representations as claimed in claim 8 wherein the means for automating an exposure process comprises means for properly shifting print material and image location relative to a lens optical axis.

16. A system for printing electronic representations as claimed in claim 8 wherein the means for automating an exposure process comprises means for properly shifting the CRT screen and a lens optical axis relative to print material.

17. A system for printing electronic representations as claimed in claim 8 wherein the means for automating an exposure process comprises means for properly shifting print material and a lens optical axis relative to the CRT screen.

* * * * *